United States Patent [19]
Werner et al.

[11] 3,954,912
[45] May 4, 1976

[54] GRAFT POLYMERS

[75] Inventors: Gerhard Werner, Glashutten; Hans-Jürgen Tietz, Langenhain, both of Germany

[73] Assignee: Hoechst Aktiengesellschaft, Frankfurt, Germany

[22] Filed: Sept. 16, 1974

[21] Appl. No.: 506,019

[30] Foreign Application Priority Data

Sept. 22, 1973 Germany.............................. 2347813

[52] U.S. Cl........................... 260/880 R; 260/879; 526/15; 526/25; 526/26; 526/60; 526/79; 526/82; 526/49; 526/54; 526/308; 526/317; 260/29.1 R; 260/42

[51] Int. Cl.²....................................... C08F 277/00

[58] Field of Search............ 260/78.4 D, 879, 880 R

[56] References Cited
UNITED STATES PATENTS

| | | | |
|---|---|---|---|
| 3,005,800 | 10/1961 | Powers et al. ................. | 260/78.4 D |
| 3,714,295 | 1/1973 | Nakayama .......................... | 260/879 |
| 3,775,381 | 11/1973 | Hayashi et al. ................ | 260/78.4 D |
| 3,856,759 | 12/1974 | Koishi et al. .................. | 260/78.4 D |

FOREIGN PATENTS OR APPLICATIONS

| | | | |
|---|---|---|---|
| 42-7,334 | 1967 | Japan............................ | 260/78.4 D |
| 46-17,579 | 1971 | Japan............................ | 260/78.4 D |

*Primary Examiner*—William F. Hamrock
*Attorney, Agent, or Firm*—Littlepage, Quaintance, Murphy & Dobyns

[57] ABSTRACT

A process for the preparation of a graft copolymer which comprises reacting (I) a hydrocarbon resin based on cyclopentadiene or methylcyclopentadiene or both at an elevated temperature with (II) an olefinically unsaturated polycarboxylic acid compound and (III) a copolyerisable unsaturated monomer in a manner such that for at least a part of the reaction the unsaturated monomer (III) and the polycarboxylic acid compound (II) are simultaneously present, a graftpolymer based on I. a hydrocarbon resin based on cyclopentadiene or methylcyclopentadiene or on both as essential monomers, II. olefinically unsaturated polycarboxylic acid compounds and III. copolymerisable unsaturated monomers and a printing ink which comprises, as at least part of the binder component, said polymer, a pigment and a solvent.

12 Claims, No Drawings

GRAFT POLYMERS

This invention is concerned with a process for the preparation of resins possessing utility as binders. Such binders may be used in the production of printing inks especially toluene intaglio printing inks.

Intaglio printing inks comprise a dispersion of a pigment in a solution of a binder. Such inks must produce an acceptable degree of brightness and colour intensity during the minimum period of drying and with a wide variety of industrially used pigments.

A large number of colophony-based binders have been proposed for this purpose. In such binders, however, the starting material is a natural substance whose characteristics depend on its source and age so that the character of the composition can vary according to the particular colophony used. Furthermore supplies of the resin are limited and, in the future, it is foreseeable that there will be shortages.

Cyclopentadiene resins have been proposed as replacements for colophony as binders however, when used as binders in printing inks, unmodified cyclopentadiene resins have been found to have inadequate drying speed and pigment wetting.

By the term "cyclopentadiene resins" we mean hydrocarbon resins substantially comprising cyclopentadiene and/or methyl cyclopentadiene as monomers.

Unsaturated acids and/or their anhydrides, inasfar as they exist, such as maleic acid, fumaric acid or fatty acids can be added to the cyclopentadiene resins. When used as binders in toluene intaglio printing inks fatty acid-containing resins have been found to have unacceptably long drying times. A further disadvantage of addition products with maleic anhydride is that they readily polymerise further under the influence of heat and, due to the resulting high melting viscosity they are difficult to prepare on an industrial scale.

It has been proposed to modify a petroleum resin with an unsaturated fatty acid or a metal salt thereof. Small amounts of styrene are added to reduce the smell. Although these products dry rapidly they have inferior pigment wetting ability as compared to the corresponding colophony-modified phenol resins.

In addition, reaction products of cyclopentadiene resins with various monomers such as styrene, vinyl acetate, acrylates or the like are known, but they cannot be used in the intaglio printing field due to their long drying times.

We have now found that the above-indicated disadvantages can be obviated and we have been able to prepare high quality products which are ideally suited for use as printing ink binders on an industrial scale.

The invention provides a process for the preparation of a graft copolymer which comprises reacting (I) a hydrocarbon resin based on cyclopentadiene and/or methylcyclopentadiene at an elevated temperature with (II) an olefinically unsaturated polycarboxylic acid compound and (III) a copolymerisable unsaturated monomer in a manner such that for at least a part of the reaction the unsaturated monomer (III) and the polycarboxylic acid compound (II) are simultaneously present.

By the term "polycarboxylic acid compound" as used herein we mean compounds possessing a free carboxyl group as well as the usual functional derivatives thereof such as anhydrides, insofar as they exist, and esters.

The copolymerisable unsaturated monomer (III) is preferably a vinyl aromatic hydrocarbon.

The invention also provides graft copolymers from (I) hydrocarbon resins essentially based on cyclopentadiene and/or methylcyclopentadiene as monomers, (II) olefinically unsaturated polycarboxylic acid compounds and (III) copolymerisable unsaturated monomers.

The hydrocarbon resin (I) is conveniently derived from industrially obtained hydrocarbon fractions which are rich in cyclopentadiene and/or methyl cyclopentadiene or from the Diels-Alder Adducts obtained in the thermal polymerisation of $C_5$ fractions e.g. at temperatures above 200°C and under excess pressure. The starting materials may, if desired, be copolymerised with unsaturated aromatic hydrocarbons such as α and β-methyl styrene, o, m, p-vinyl toluene, indene or aromatic petroleum fractions containing these components, in each case alone or in mixture. Optionally these monomers can be used concomitantly as solvents for resin (I).

The hydrocarbon resins (I) may, with advantage, be reacted with components (II) and (III) is the solution in which they are formed. Resins (I) may have a molecular weight of 200 to 4,000, preferably 300 to 1,200. The melting temperatures of the resins can be from 40° to 250°C, and polymers with melting temperatures of 60° to 130°C are preferred.

Suitable unsaturated polycarboxylic acid compounds (II) include maleic acid, fumaric acid, itaconic acid, mesaconic acid, citraconic acid, Δ-1,2-tetrahydrophthalic acid or their anhydrides, esters (including hemi-esters) or amides. Maleic anhydride is particularly preferred. The quantity of acid compound (II) employed may be from 0.1 to 40, preferably 8 to 15%, by weight based on resin (I).

Suitable copolymerisable monomers (III) include vinyl monomers, e.g. styrene, o, m, p-vinyl toluene, α-methyl styrene, acrylic or methacrylic acid and their esters and amides as well as etherified amides each having 1 to 8 carbon atoms in the ester or amide radical, for example methyl acrylate, butyl acrylate, the corresponding methacrylic acid compounds, acrylamide or methacrylamide. Other monomers include vinyl acetate and mixtures of any of the above monomers may be used. Styrene is the preferred monomer. The molar ratio of the unsaturated carboxylic acid compound to the copolymerisable monomer is generally (0.3 to 5) : 1 and preferably (0.5 to 2) : 1.

The reaction is preferably effected in the presence of a solvent, e.g. in aromatic solvents, such as the above mentioned ones. Preferred solvents are those which do not react with the polycarboxylic acid compounds or their anhydrides and allow the process to be carried out without empolying excess pressure. In order to obtain completely soluble and low-viscosity resins, it has proved particularly advantageous to use those solvents which at the particular reaction temperatures used, have a pronounced chain-cleaving action, e.g. xylene, ethyl benzene, cumene, tetrahydronaphthalene, mixtures of alkylated benzenes with boiling ranges of 100° to 200°C. e.g. from 150° to 200°C (trade name "Solvesso 100" or "150"), ketones having a boiling range of 55 to about 200°C, such as cyclohexanone, methylethyl ketone, halogenated hydrocarbons having a boiling range of 55° to 230°C, such as chlorobenzene, chloroform, carbon-tetrachloride and esters having a boiling range of 60° to 230°C, such as ethyl acetate, butyl acetate, isooctyl acetate or benzyl acetate.

The process according to the invention may be effected at a temperature of at least 70°C. Optimum temperatures will depend upon the character of the starting materials and the desired end products. Thus, for example, satisfactory results may be achieved at from 120°- 250°C, preferably from 160° to 210°C. The process may be effected under increased pressure.

The reaction with the co-monomers can take place with or without radiation or with or without the addition of initiators. The reaction is preferably effected in the presence of free-radical initiators because the yield is higher, the reaction takes place more quickly and the resins have better viscosity characteristics and these improved properties are retained in printing inks formulated from the resins. Examples of radical donors are alkyl, alkoyl, aryl, aroyl peroxides, such as di-t-butyl peroxide, dilauroyl peroxide, dicumyl peroxide, dibenzoyl peroxide, cumene hydroperoxide, t-butyl perbenzoate and isopropyl-percarbonate. The initators are generally used in quantities of 0.01 to 4, preferably 0.05 to 1% based on the weight of the starting resin.

The process according to the invention is a graft polymerisation reaction and can take place in various ways, optionally also in the melt, as illustrated hereinafter 1. A solution of the polycarboxylic acid compound e.g. maleic anhydride in at least one copolymerisable monomer, e.g. styrene, together with a radical initiator is added to the melt or solution of a cyclopentadiene resin. However, with this process, particularly when large amounts of polycarboxylic acids are used it is not always possible to avoid the formation of toluene-insoluble copolymers.

2. Initially an olefinically unsaturated dicarboxylic acid compound, e.g. maleic anhydride is added to the cyclopentadiene resin in the melt or in solution, and the mixture is subsequently reacted with the copolymerisable monomer, e.g. styrene and radical initiators. It is particularly advantageous — especially for the properties of the products — to commence the addition of the second reaction component before the total quantity of carboxylic acid compound is added. Products are then formed onto which can be grafted copolymers, e.g. styrene and maleic anhydride.

3. The cyclopentadiene resin is reacted in the melt or in solution with the copolymerisable monomer and a radical initiator. Subsequently the polycarboxylic acid compound is reacted wherein e.g. the intermediate product obtained in the first step is further reacted. Here again it has proved particularly advantageous to only partly copolymerise the cyclopentadiene resin with a copolymerisable monomer prior to the addition of the polycarboxylic acid compound so that, during the reaction, products are obtained which can be grafted on copolymers, e.g. of styrene and maleic anhydride.

The cyclopentadiene resins modified according to the invention are soluble in aromatic hydrocarbons, particularly toluene, and generally have melting temperatures of 80° to 220°C, preferably 140° to 180°C, and bromine numbers of 25 to 100. The double bond content of the resins used is substantially maintained during modification with the polycarboxylic acid compound and the monomers, thus indicating that grafted products are mainly present. As compared with the original cyclopentadiene resins and the resins reacted only with maleic anhydride, the products obtained according to the invention surprisingly have much improved thermal stability which is evidenced by the smaller rise in the melting viscosity during heating. The stability is further improved by the addition of small quantities of antioxidants such as 2,6-di-t-butyl-4-methyl phenol, di-t-butyl-pyrocatechol and dioctyl-diphenyl amine.

Various reactions can be performed on the anhydride and acid groups of the resins obtained according to the invention. They can therefore for example be esterified with aliphatic, cyclo-aliphatic or aromatic mono- and-/or polyfunctional alcohols such as methanol, ethanol, propanol, n-butanol, isobutanol, ethylhexyl-alcohol, nonyl alcohol, dodecyl alcohol, cyclohexanol, benzyl alcohol, as well as ethylene glycol, glycerol, pentaerythritol and neopentyl glycol. In this connection the carboxyl groups can be wholly or partly reacted, whereby pigment wetting is further enhanced. The melting viscosity of the resins can be simultaneously reduced by reaction with monofunctional aliphatic alcohols having more than five carbon atoms. If esterification takes place with polyfunctional alcohols, the solution viscosity of the resins can be increased. The anhydride, acid or ester groups of the products according to the invention can be wholly or partly reacted with ammonia, mono- and polyfunctional amines to yield the corresponding amides, imides or amido-imides and/or with metals of the first and second groups of the Periodic System, e.g. sodium, potassium, magnesium, calcium, barium or zinc to result in salt formation. Salt formation can sometimes be advantageous if the polarity and pigment wetting of the products has to be further increased.

The resins according to the invention can be combined during preparation or subsequently with other resins, e.g. other petroleum resins, colophony, colophony-modified phenol resins, phenol or alkyl-phenol resins and styrene-maleic anhydride copolymers.

The products obtained by the process according to the invention possess utility in a number of different areas. They are preferably used as binders for printing inks, particularly for toluene printing inks. The products obtained according to the invention, when used as binders in intaglio printing inks, have good drying characteristics and have definite advantages as compared with the hitherto used modified colophony resins in term of brightness and dispersing power particularly in the case of blue pigments. They can be used as the sole binder in the ink. In addition they can be used for paints, particularly when mixed with alkyd resins, as impregnating agents and textile aids, as low molecular weight blending resins in adhesives, particularly fusion adhesives, in road marking paints and as a component of hot casting compounds, paper size and core binders.

The following examples illustrate the invention. In the Examples parts referred to are parts by weight and percentages are percentages by weight. Unless otherwise stated, the viscosity was measured in a 50% toluene solution at 20°C.

EXAMPLE 1

In a reaction vessel having a stirrer and a reflux condenser 400 parts of a cyclopentadiene resin (prepared from a dimerised $C_5$-fraction by thermic polymerisation and having a melting point of 80°C, a bromine number of 53 and an average molecular weight of 600) are heated to 180°C with 100 parts of tetrahydronaphthalene. Subsequently a heated solution of 40 parts of maleic anhydride and 0.8 parts of di-tert.-butylperoxide in 40 parts of styrene is dropwise added over a period of 30 minutes. The mixture is reacted for a further 30 minutes and then the solvent is distilled off. Towards the end of the distillation the mixture is dried at a temperature of 220°C in vacuo. 471 parts of a resin having a melting point of 167°C and a viscosity of 220 cP are obtained.

EXAMPLE 2

Proceeding in a manner analogous to that described in Example 1 but with a mixture of 20 parts of styrene and 25 parts of a technical vinyltoluene mixture instead of 40 parts of styrene. 475 parts of a resin having a melting point of 149°C and a viscosity of 190 cP are obtained.

EXAMPLE 3

400 parts of cyclopentadiene resin (as used in Example 1) are melted in a reaction vessel having a stirrer and a reflux condenser. Subsequently at a reaction temperature of 180°C a solution of 1.2 parts of di-tert.-butylperoxide in 120 parts of styrene are added portionwise over a period of 30 minutes. The mixture is reacted for a further 10 minutes. 80 parts of maleic anhydride are then added over a period of about 5 minutes. The mixture is maintained at 180°C for a further 60 minutes. Unreacted components are removed by heating to 230°C. 580 parts of a resin having a melting point of 170°C and a viscosity of 350 cP are obtained.

EXAMPLE 4

Proceeding in a manner analogous to that descirbed in Example 3 but adding 30 parts of 2-ethylhexanol before drying. The mixture is reacted at 230°C for one hour. 610 parts of resin having a melting point of 158°C and a viscosity of 300 cP are obtained.

EXAMPLE 5

400 parts of cyclopentadiene resin (as used in Example 1) are melted and, at 180°C, 80 parts of maleic anhydride are added and the mixture is maintained at this temperature for a further 60 minutes. Subsequently a solution of 1.2 parts of di-tert.-butylperoxide in 120 parts of styrene is added portionwise over a period of 30 minutes. The mixture is reacted at 180°C for a further 60 minutes and at 230°C for a further 120 minutes. 570 parts of a resin having a melting point of 170°C and a viscosity of 400 cP are obtained.

EXAMPLE 6

Proceeding in a manner analogous to that described in Example 5 but employing 100 parts of colophony with the cyclopentadiene resin one obtains 670 parts of a resin having a melting point of 158°C and a viscosity of 300 cP.

EXAMPLE 7

Proceeding in a manner analogous to that described in Example 1 but instead of the solution of maleic anhydride a heated solution of 40 parts of maleic anhydride, 0.8 parts of di-tert.-butyl-peroxide and 20 parts of dibutyl maleate in 40 parts of styrene is added dropwise over a period of 30 minutes. 485 parts of a resin having a melting point of 153°C and a viscosity of 200 cP are obtained.

EXAMPLE 8

Proceeding in a manner analogous to that described in Example 1 but instead of the solution of maleic anhydride in styrene a solution of 40 parts of maleic anhydride and 0.8 parts of di-tert.-butylperoxide in 40 parts of styrene and 10 parts of methyl acrylate is added dropwise over a period of 30 minutes. 480 parts of a resin having a melting point of 162°C and a viscosity of 220 cP are obtained.

EXAMPLE 9

Proceeding in a manner analogous to that described in Example 5 but using 50 parts of fumaric acid instead of 80 parts of maleic anhydride one obtains 560 parts of a resin having a melting point of 168°C and a viscosity of 350 cP.

PREPARATION OF TOLUENE PHOTOGRAVURE INKS 100 parts of the modified cyclopentadiene resin prepared according to examples 1 to 6 or an unmodified cyclopentadiene resin (comparison test 1) or a phenol resin (a diphenylolpropane condensation product prepared in alkaline medium) modified with colophony and subsequently substantially esterified with pentaerythritol (characteristics: melting point 138°C (capillary method), viscosity 250 to 350 cP, acid number 20) (comparison test 2) are dissolved in 100 parts of toluene. This solution is dispersed with 20 parts of the blue pigment "Heliogen Blau" (BASF AG) in a ball mill. The dispersion is adjusted to a through time of 17 seconds (DIN 4 cup).

Printing test

The solids content, solvent flash-off time (a measure of the rate of solvent release) and gloss of the photogravure ink prepared from the above binders have been measured in comparison with two other resins. The printing inks were applied to a commercial machine coated paper by means of a "hand coater" (coiled wire) at a wet film thickness of 36 μ (weight of the DIN A 4 paper sheet 5.4g). The solvent flash-off is determined by the period of time in seconds from applying the printing inks until they are tack-free by contact with the side of the hand. The gloss test is according to Lange (Zeidler-Bleisch "Laboratoriumsbuch fur die Lack- und Anstrichmittel-industrie" (1967), page 327, edition Wilhelm Knapp, Dusseldorf) colour layers of the same thickness are used. The solids content of the printing ink (resin and pigment) is measured by simple determination of the residue at 150°C after 30 minutes. The results are given in the following table.

| Sample | Solvent flash off (seconds) | Gloss according to Lange 36 μ | Solids content % by weight |
|---|---|---|---|
| 1 | 38 | 32 | 41 |
| 2 | 40 | 20 | 38 |
| 3 | 43 | 22 | 43 |
| 4 | 41 | 30 | 39 |
| 5 | 39 | 28 | 40 |
| 6 | 43 | 25 | 43 |
| Comparison test 1 | 140 | 6 | 48 |
| Comparison test 2 | 49 | 16 | 41 |

The table shows that at about the same solvent flash off the gloss and therefore the pigment wetting of the resins according to the invention are distinctly improved. The products correspond to the requirements of the printing inks industry to prepare printing inks with flash off times as short as possible, i.e., with a solvent release as short as possible combined with a high gloss.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A process for the preparation of a graft copolymer which comprises reacting
   I. a hydrocarbon resin based on cyclopentadiene or methylcyclopentadiene which resin has been prepared by thermal polymerization of a starting material selected from the group consisting of a) technical fractions being rich in cyclopentadiene or methylcyclopentadiene or both and b) a Diels-Alder adduct obtained in an elevated temperature thermal dimerisation of a polymerizable hydrocarbon $C_5$-fractions
   II. an olefinically unsaturated polycarboxylic acid compound and
   III. a copolymerisable vinyl aromatic hydrocarbon monomer in a manner such that for at least a part of the reaction the unsaturated monomer (III) and the polycarboxylic acid compound (II) are simultaneously present to yield a reaction product having a melting point of at least 140°C.

2. A process as claimed in claim 1 wherein the reaction is performed in the presence of at least one of the substances a free radical initiator and a solvent, wherein the amount of free radical initiator is from 0.01 to 4% by weight based on the weight of starting hydrocarbon resin.

3. A process as claimed in claim 1 wherein the starting hydrocarbon resin has a molecular weight of from 200 to 4000.

4. A process as claimed in claim 1 wherein the molar ratio of the unsaturated copolymerisable monomer (III) to the unsaturated polycarboxylic acid compound (II) is 1 : (0.3 to 5).

5. A process as claimed in claim 1 wherein the amount of the unsaturated polycarboxylic acid compound (II) is 0.1 to 40 % by weight, referred to the starting resin.

6. A process as claimed in claim 1 wherein the reaction is performed in the presence of a solvent having a strong chain-stopping effect under the reaction conditions and being selected from the group consisting of xylene, ethyl benzene, cumene, tetrahydronaphthalene, mixtures of alkylated benzenes with boiling ranges of 100° to 200°C, ketones having a boiling range of 55° to about 200°C, halogenated hydrocarbons having a boiling range of 55° to 230°C, and esters having a boiling range of 60° to 230°C.

7. A process as claimed in claim 1 wherein the reaction takes places according to one of the embodiments:
   A. a solution of the polycarboxylic acid compound (II) in the copolymerisable monomer (III) is added to a solution of the hydrocarbon resin (I) together with a free radical initiator,
   B. firstly in a melt or solution of the hydrocarbon resin (I) an olefinically unsaturated polycarboxylic acid compound (II) is added and subsequently the mixture is reacted with the copolymerisable monomer (III) and a free radical initiator,
   C. the addition of the second reactant is begun before the total chemical addition of the olefinically unsaturated polycarboxylic acid compound (II) has been completed, and
   D. the hydrocarbon resin (I) is reacted in a melt or solution with a copolymerisable monomer (III) and a free radical initiator and subsequently the intermediate product is further reacted with a polycarboxylic acid compound (II).

8. A process as claimed in claim 1 wherein the anhydride or carboxylic groups of the final reaction products are at least partially modified by a reaction selected from the group consisting of: (a) an esterification with an alcohol having up to 12 carbon atoms, (b) reaction with at least one of the substances ammonia, an amine, a compound of a metal of one of groups (I) and (II) of the Periodic Table under an at least partial salt formation.

9. A graft-polymer produced by the process as claimed in claim 1.

10. A printing ink which comprises, as at least part of the binder component, a polymer as claimed in claim 12 a pigment and a solvent.

11. A process as claimed in claim 1 wherein the hydrocarbon resin (I) is reacted with maleic anhydride as component (II) and with styrene as component (III).

12. A graft-polymer as claimed in claim 9 based on maleic anhydride as component (II) and on styrene as component (III).

* * * * *